(12) United States Patent
Sundararajan et al.

(10) Patent No.: US 10,619,541 B2
(45) Date of Patent: Apr. 14, 2020

(54) REDUCTANT DOSING QUANTITY CORRECTION BASED ON ACCUMULATED ERROR DURING REDUCTANT INSERTION

(71) Applicant: Cummins Emission Solutions Inc., Columbus, IN (US)

(72) Inventors: Vikram Sundararajan, Columbus, IN (US); Joe V. Hill, Columbus, IN (US); Kern Lik Tan, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 190 days.

(21) Appl. No.: 15/839,424

(22) Filed: Dec. 12, 2017

(65) Prior Publication Data

US 2019/0178132 A1 Jun. 13, 2019

(51) Int. Cl.
*F01N 3/00* (2006.01)
*F01N 3/20* (2006.01)

(52) U.S. Cl.
CPC ........ *F01N 3/208* (2013.01); *F01N 2610/146* (2013.01); *F01N 2610/1433* (2013.01); *F01N 2900/1808* (2013.01); *F01N 2900/1812* (2013.01)

(58) Field of Classification Search
CPC ............. F01N 3/208; F01N 2900/1812; F01N 2900/1808; F01N 2610/1433
USPC .......................................................... 60/274
See application file for complete search history.

(56) References Cited

U.S. PATENT DOCUMENTS

| 8,776,503 | B2* | 7/2014 | Wang | ...................... F01N 3/208 60/295 |
| 8,920,757 | B1 | 12/2014 | Chandrapati et al. | |
| 9,169,784 | B2 | 10/2015 | Moonjelly et al. | |
| 9,518,528 | B2 | 12/2016 | Lana | |
| 9,932,871 | B2* | 4/2018 | Johnson | ................. F01N 3/2066 |
| 2007/0042495 | A1* | 2/2007 | Pavlova-MacKinnon | .................... F01N 3/208 436/55 |
| 2012/0067031 | A1 | 3/2012 | Wang et al. | |
| 2014/0352280 | A1 | 12/2014 | Qi et al. | |
| 2015/0053184 | A1 | 2/2015 | Ruth et al. | |
| 2015/0283508 | A1 | 10/2015 | Nelson et al. | |
| 2017/0107877 | A1 | 4/2017 | Johnson et al. | |

(Continued)

OTHER PUBLICATIONS

International Search Report & Written Opinion for PCT/US2018/063602 dated Feb. 11, 2019, 22 pages.

*Primary Examiner* — Jason D Shanske
(74) *Attorney, Agent, or Firm* — Foley & Lardner LLP

(57) ABSTRACT

An assembly for reductant dosing error correction in an exhaust aftertreatment system includes an injector comprising a reductant insertion conduit; a pump configured to advance a quantity of dosed fluid reductant from a reductant source; a reductant source outlet defined by the reductant source and configured to release the quantity of dosed fluid reductant into the reductant insertion conduit; a pressurized reductant receiving chamber defining a pressurized reductant receiver inlet; a reductant insertion pressure sensor; and a doser comprising a controller. The controller of the doser is configured to, based on a first actual pressure of the reductant, calculate a second target flow rate for a second injection event subsequent to a first injection event and control a quantity of dosed fluid reductant released during the second injection event based on the second target flow rate.

17 Claims, 5 Drawing Sheets

(56) References Cited

U.S. PATENT DOCUMENTS

2017/0241314 A1     8/2017   Khaled et al.
2019/0178130 A1*   6/2019   DeHart .................. F01N 3/208

* cited by examiner

REDUCTANT DOSING QUANTITY CORRECTION BASED ON ACCUMULATED ERROR DURING REDUCTANT INSERTION

TECHNICAL FIELD

The present application relates generally to systems and methods for reductant dosing quantity correction based on accumulated error during reductant insertion.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen and water, with the aid of a catalyst and a reductant. The catalyst may be included in a catalyst chamber of an exhaust system, such as that of a vehicle or power generation unit. A reductant may be typically introduced into the exhaust gas flow prior to the catalyst chamber. To introduce the reductant into the exhaust gas flow for the SCR process, the reductant is introduced through a dosing module (doser), which inserts (e.g., injects) the reductant into an exhaust pipe of the exhaust system upstream of the catalyst chamber. The injector rest period and the injection event together comprise an injection cycle. The SCR system may include one or more sensors to monitor conditions within the exhaust system.

Reductants and/or reductant precursor formulations include solids, gases, and liquids. Examples of solid reductant precursor formulations and/or carriers include ammonium salts and metal ammines. In solid-state reductant delivery systems, a cartridge or canister with a solid material, such as an ammonia precursor or a substance with absorbed ammonia, is carried onboard. During engine operation, the carrier material is heated to release ammonia gas, which is metered into the exhaust gas. Examples of gaseous reductant formulations include gaseous ammonia, ammonia-air mixtures, and ammonia-nitrogen mixtures. Examples of liquid reductant formulations include aqueous ammonia and automotive-grade urea such as AdBlue®, BlueTEC™, and other Diesel Exhaust Fluid (DEF) products. An example ISO 22241-1:2006 DEF is an aqueous urea solution including 32.5% urea and 67.5% deionized water. The urea in the DEF turns to ammonia when heated. The ammonia reacts with the $NO_x$ in the exhaust stream to chemically reduce the $NO_x$ to water ($H_2O$) and nitrogen ($N_2$).

A pump may be used to pressurize the reductant for delivery from the reductant source to the dosing module and/or an SCR catalyst. Problematically, actual reductant delivery and dosing rates may vary from the expected reductant delivery and dosing rates in reductant delivery systems, which affects the accuracy and precision of the reductant flow and results in emission spikes due to fluctuations of the reductant dosed into the system. First, errors in flow rate may occur due to deviation of pressure from target during the pressure recovery period. Limitations to shortening the recovery period include mechanical lag and lack of accumulation at the point of injection. Second, even where it is possible to determine the error in flow rate, the injection cycle of the dosing unit may be too short to apply any real-time correction. These factors can result in emission spikes over time due to difference between expected and actual dosing quantity.

According to one conventional approach to error correction in reductant dosing using liquid (DEF) injection, pressure at the start of a reductant injection period can be recorded and used for correction to target pressure. However, a drawback associated with this approach is that the recorded pressure at the start may not be representative of the average pressure throughout the dosed period. Even if the pressure does recover to target, it may be impossible to determine if the pressure at the start of injection is the same as the target pressure. Additionally, the error during recovery is not accounted for. According to another conventional approach to error correction focused on liquid DEF injection, the delivered amount of DEF is allowed to accumulate over a prescribed sampling interval until the requested reductant quantity is reached within the specified injection period. However, a drawback associated with this approach is its underlying assumption that it is possible to dynamically make this determination on time within the current injection cycle.

SUMMARY

Implementations described herein relate to reductant dosing quantity correction based on accumulated error during reductant insertion, in particular to dosing quantity correction using a pressure value, measured at the point of reductant insertion, as an input for estimating the actual reductant flow rate in the current reductant insertion cycle and correcting the target reductant flow rate for a subsequent reductant insertion cycle. In some embodiments, the quantity of dosed reductant is controlled by adjusting the length of a subsequent injection event.

One set of embodiments relates to an assembly for reductant dosing error correction in an exhaust aftertreatment system. The assembly includes an injector fluidly coupled to a reductant source. The injector includes a reductant insertion conduit. The assembly further includes a pump configured to advance a quantity of dosed fluid reductant from the reductant source, a reductant source outlet defined by the reductant source and configured to release the quantity of dosed fluid reductant into the reductant insertion conduit, a pressurized reductant receiving chamber defining a pressurized reductant receiver inlet, a reductant insertion pressure sensor positioned at the pressurized reductant receiver inlet, and a doser comprising a controller and coupled to the reductant insertion pressure sensor. The assembly is configured to effectuate a first injection cycle that comprises a first injector rest period and a first injection event. The first injection cycle has a first target flow rate. The reductant insertion pressure sensor is configured to determine a first actual pressure of the reductant during the first injection event at the pressurized reductant receiver inlet. The controller of the doser is configured to, based on the first actual pressure of the reductant, calculate a second target flow rate for a second injection cycle subsequent to the first injection cycle, and to control a quantity of dosed fluid reductant released into the reductant insertion conduit during the second injection cycle based on the second target flow rate.

In some embodiments, the reductant insertion conduit includes a reductant insertion control valve, and the quantity of dosed fluid reductant released into the reductant insertion conduit is controlled by moving the reductant insertion control valve to define a size of the pressurized reductant receiver inlet. The pressurized reductant receiver inlet has a variable reductant insertion cross-sectional area defining an actual volume of the quantity of dosed fluid reductant, and defining the size of the pressurized reductant receiver inlet comprises adjusting the size of the cross-sectional area.

In some embodiments, the quantity of dosed fluid reductant released into the reductant insertion conduit during the second injection cycle is controlled by adjusting the duration of the second injection cycle.

In some embodiments, the controller is further configured to calculate the second target flow rate for the second injection cycle by: determining a first actual flow rate at the pressurized reductant receiver inlet for the quantity of dosed fluid reductant, the first actual flow rate based on the first actual pressure of the reductant measured during the first injection cycle; determining a pressure-based dosing error for the first injection event, the pressure-based dosing error based on a calculated deviation of the first actual flow rate from a first target flow rate, the deviation being calculated based on a first target volume of the quantity of dosed fluid reductant; and determining a compensation factor for reductant dosing based on the pressure-based dosing error, the compensation factor including at least a target duration for the second injection event of the second injection cycle. The second injection cycle follows the first injection cycle.

In some embodiments, the controller is further configured to apply the second target flow rate to dose reductant in a subsequent injection cycle, the subsequent injection cycle following the first injection cycle. In some embodiments, the subsequent injection cycle is the second injection cycle immediately following the first injection cycle. In other embodiments, the controller is further configured to: calculate a third target flow rate for a third injection cycle following the second injection cycle, the third target flow rate reflective of an accumulated dosing error over the first injection cycle and the second injection cycle; and apply the third target flow rate in the subsequent injection cycle. The second injection cycle immediately follows the first injection cycle and the subsequent injection cycle follows the second injection cycle such that dosing errors are accumulated.

Another set of embodiments relates to a method for reductant dosing error correction in an exhaust aftertreatment system. The method comprises providing an assembly. The assembly comprises an injector fluidly coupled to a reductant source, the injector comprising a reductant insertion conduit. The assembly further comprises a pump configured to advance a quantity of dosed fluid reductant from the reductant source; a reductant source outlet defined by the reductant source and configured to release the quantity of dosed fluid reductant into the reductant insertion conduit; a pressurized reductant receiving chamber defining a pressurized reductant receiver inlet; a reductant insertion pressure sensor positioned at the pressurized reductant receiver inlet; and a doser comprising a controller and coupled to the reductant insertion pressure sensor. The method further comprises effectuating a first injection cycle that comprises a first injector rest period and a first injection event. The first injection cycle has a first target flow rate. The method further comprises determining a first actual pressure of the reductant during the first injection event at the pressurized reductant receiver inlet; based on the first actual pressure of the reductant, calculating a second target flow rate for a second injection cycle subsequent to the first injection cycle; and controlling a quantity of dosed fluid reductant released into the reductant insertion conduit during the second injection cycle based on the second target flow rate.

In some embodiments, the reductant insertion conduit includes a reductant insertion control valve, and the quantity of dosed fluid reductant released into the reductant insertion conduit is controlled by moving the reductant insertion control valve to define a size of the pressurized reductant receiver inlet. The pressurized reductant receiver inlet has a variable reductant insertion cross-sectional area defining an actual volume of the quantity of dosed fluid reductant, and defining the size of the pressurized reductant receiver inlet comprises adjusting the size of the cross-sectional area.

In some embodiments, the quantity of dosed fluid reductant released into the reductant insertion conduit is controlled by adjusting the duration of the second injection cycle.

In some embodiments, the method further comprises calculating the second target flow rate for the second injection cycle, which includes: determining a first actual flow rate at the pressurized reductant receiver inlet for the quantity of dosed fluid reductant, the first actual flow rate based on the first actual pressure of the reductant measured during the first injection cycle; determining a pressure-based dosing error for the first injection event, the pressure-based dosing error based on a calculated deviation of the first actual flow rate from a first target flow rate, the deviation being calculated based on a first target volume of the quantity of dosed fluid reductant; and determining a compensation factor for reductant dosing based on the pressure-based dosing error, the compensation factor including at least a target duration for the second injection event of the second injection cycle. The second injection cycle follows the first injection cycle.

In some embodiments, the method further comprises applying the second target flow rate to dose reductant in a subsequent injection cycle. The subsequent injection cycle follows the first injection cycle. In some embodiments, the subsequent injection cycle is the second injection cycle immediately following the first injection cycle. In other embodiments, the method further comprises calculating a third target flow rate for a third injection cycle following the second injection cycle, the third target flow rate reflective of an accumulated dosing error over the first injection cycle and the second injection cycle; and applying the third target flow rate in the subsequent injection cycle. The second injection cycle immediately follows the first injection cycle and the subsequent injection cycle follows the second injection cycle such that dosing errors are accumulated. In some embodiments, the quantity of dosed fluid reductant is injected over multiple injection cycles.

BRIEF DESCRIPTION OF THE FIGURES

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of reductant dosing quantity correction based on accumulated error during reductant insertion. The various concepts introduced above and discussed in greater detail below may be implemented in any of numerous ways, as the described concepts are not limited to any particular manner of implementation. Examples of specific implementations and applications are provided primarily for illustrative purposes.

1. Overview

Methods, apparatus, assemblies and/or systems are provided to improve certain performance characteristics of an aftertreatment system, including, for example, reductant dosing quantity correction based on accumulated error during reductant insertion. As will be appreciated, systems and methods for reductant dosing quantity correction include flow rate error compensation in subsequent reductant insertion cycles. The flow rate error (the difference between a target flow rate and an actual flow rate during a reductant insertion cycle) is due to pressure pulsations associated with the operation of the reductant delivery system. Pressure is measured at the point of reductant insertion and is used as the input for flow rate estimation in the current reductant insertion cycle. A compensation factor reflective of the estimated error in flow rate during the current cycle is determined based on the pressure and applied to the target flow rate in the subsequent reductant insertion cycle or reductant injection event. The reductant quantity delivered during the subsequent cycle is corrected. In some embodiments, the pressure signal at the point of reductant insertion is used as feedback to calculate and accumulate flow rate errors over multiple cycles for correction in a subsequent cycle.

2. Overview of Aftertreatment System

Figure 1:
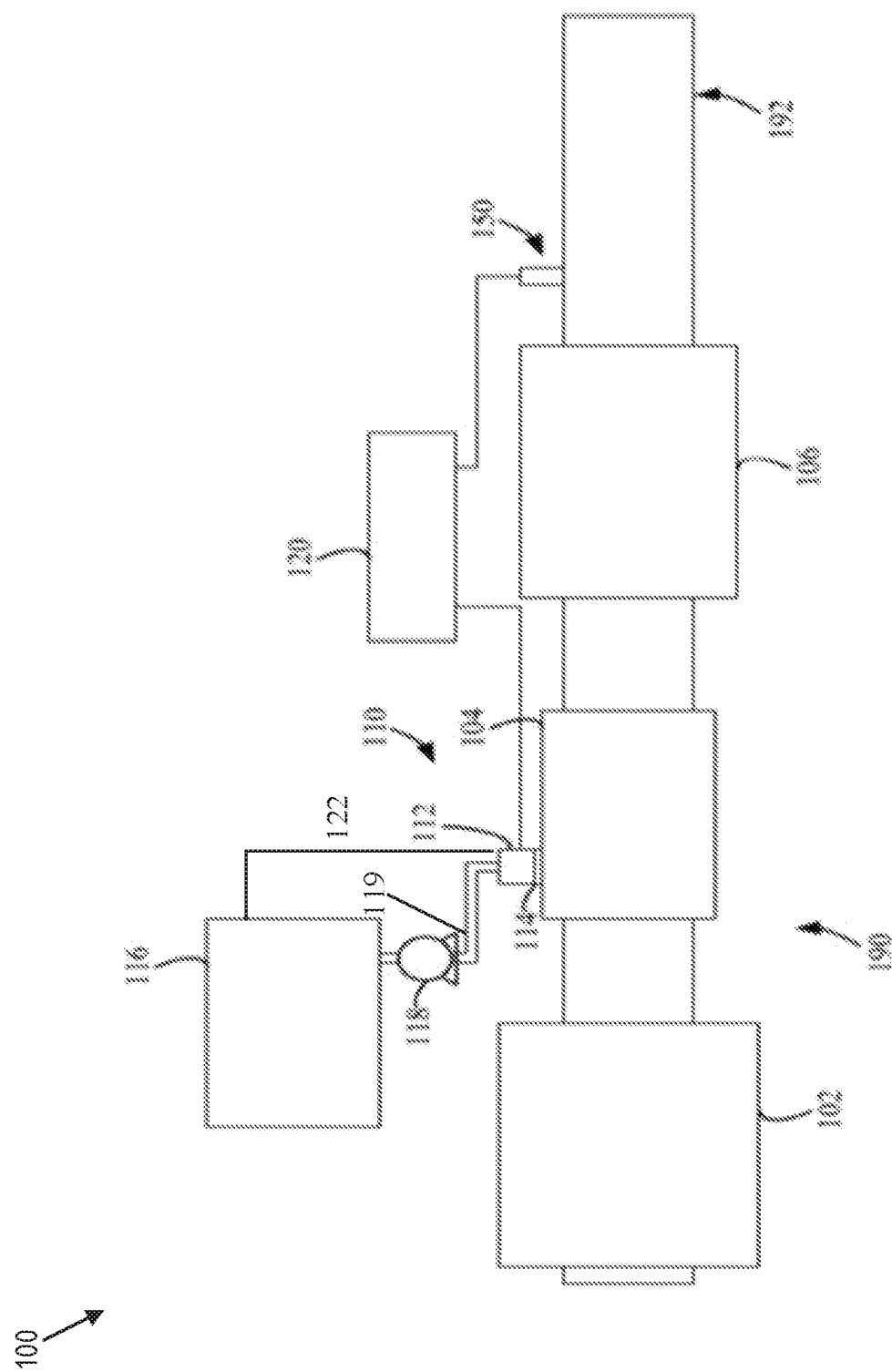
FIG. 1 is a block schematic diagram of an example aftertreatment system comprising an example reductant delivery system for an exhaust system.

FIG. 1 depicts an aftertreatment system 100 having an example reductant delivery system 110 for an exhaust system 190. The aftertreatment system 100 includes a particulate filter 102 (such as a diesel particulate filter (DPF)), the reductant delivery system 110, a decomposition chamber or reactor 104, a SCR catalyst unit 106, and a sensor 150.

The particulate filter 102 is configured to remove particulate matter, such as soot, from exhaust gas flowing in the exhaust system 190. The particulate filter 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea or diesel exhaust fluid (DEF), into ammonia. The decomposition chamber 104 includes the reductant delivery system 110 having a dosing system 112 configured to dose the reductant into the decomposition chamber 104. In some implementations, the reductant is inserted upstream of the SCR catalyst unit 106. The reductant droplets then undergo the processes of evaporation, thermolysis, and hydrolysis to form gaseous ammonia within the exhaust system 190. The decomposition chamber 104 includes an inlet in fluid communication with the particulate filter 102 to receive the exhaust gas containing $NO_x$ emissions and an outlet for the exhaust gas, $NO_x$ emissions, ammonia, and/or remaining reductant to flow to the SCR catalyst unit 106.

The decomposition chamber 104 includes the dosing system 112 mounted to the decomposition chamber 104 such that the dosing system 112 may dose the reductant into the exhaust gases flowing in the exhaust system 190. The dosing system 112 may include an insulator 114 interposed between a portion of the dosing system 112 and the portion of the decomposition chamber 104 to which the dosing system 112 is mounted. The dosing system 112 is fluidly coupled to one or more reductant sources 116 via the reductant insertion conduit 119. As further described with reference to the embodiment of FIG. 2, the reductant insertion conduit 119 includes a reductant delivery pipe 119a and a reductant insertion control valve 119b.

In some implementations, a pump 118 is used to pressurize the reductant from the reductant source 116 for delivery to the dosing system 112. The pump 118 is fluidly coupled to the reductant source 116. In some implementations, the pump 118 is a reciprocating displacement pump, such as a piston pump, a plunger-type pump, and/or a diaphragm pump. In other implementations, the pump 118 is a centrifugal pump. According to various embodiments, the pump 118 may be unidirectional or bidirectional. Where the pump 118 is bidirectional, the aftertreatment system 110 may be configured such that a portion of the reductant is returned to the reductant source 116 via the reductant insertion conduit 119 or another suitable conduit. In some implementations, the pump 118 is a variable displacement pump configurable to adjust the amount of the dosed reductant as the reductant is advanced from the reductant source 116.

The dosing system 112 and pump 118 are electrically or communicatively coupled to a controller 120. The controller 120 is configured to control the dosing system 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language. The controller 120 may be communicatively coupled to other components of the system though a suitable electrical or electronic communications interface.

The SCR catalyst unit 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst unit 106 includes an inlet in fluid communication with the decomposition chamber 104 from which exhaust gas and reductant is received and an outlet in fluid communication with an end of the exhaust system 190.

The exhaust system 190 may further include an oxidation catalyst unit (e.g., a diesel oxidation catalyst (DOC) unit) in fluid communication with the exhaust system 190 (e.g., downstream of the SCR catalyst unit 106 or upstream of the particulate filter 102) to oxidize hydrocarbons and carbon monoxide in the exhaust gas.

In some implementations, the particulate filter 102 is positioned downstream of the decomposition chamber or reactor pipe 104. For instance, the particulate filter 102 and the SCR catalyst unit 106 may be combined into a single unit. In some implementations, the dosing system 112 may instead be positioned downstream of a turbocharger or upstream of a turbocharger.

The sensor 150 is coupled to the exhaust system 190 to detect an operating condition associated with the exhaust system 190, such as a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst unit 106, it should be understood that the sensor 150 may be positioned at any other position of the exhaust system 190, including upstream of the particulate filter 102, within the particulate filter 102, between the particulate filter 102 and the decomposition chamber 104, within the decomposition chamber 104, between the decomposition chamber 104 and the SCR catalyst unit 106, within the SCR catalyst unit 106, or downstream of the SCR catalyst unit 106. In addition, two or more sensor 150 may be utilized for detecting a condition of the exhaust gas or other components of the exhaust system 190. For example, two, three, four, five, or size sensor 150 with each sensor 150 may be located at one of the foregoing positions of the exhaust system 190.

It should be understood that, while the example embodiment of FIG. 1 is an aftertreatment system that includes an SCR catalyst, the systems and methods disclosed and claimed herein may be implemented and/or practiced in other suitable systems.

3. Implementations of Systems and Methods for Reductant Dosing Quantity Correction Based on Accumulated Error During Reductant Insertion In some implementations, the reductant insertion quantities are pulsed flows, which induces pressure fluctuations at the point of reductant insertion. As discussed in reference to FIG. 3, the pressure fluctuations result from variances, throughout a reductant insertion cycle, of the ratio of the flow rate to the maximum capacity within the assembly for fluid reductant insertion. Pressure fluctuations result in dosed flow rate errors such that the actual volume of the reductant dosed during a injection event is different from the target volume of reductant for that injection event. These differences are approximated by calculating the actual dosed amount using real-time or near real-time measurements of the reductant flow rate at the reductant insertion point and correcting the dosed flow rate error induced by pressure fluctuations. In some embodiments, the time at which error correction is applied is determined based on the constraints associated with the update rate and the update intervals of the controller software.

Figure 2:
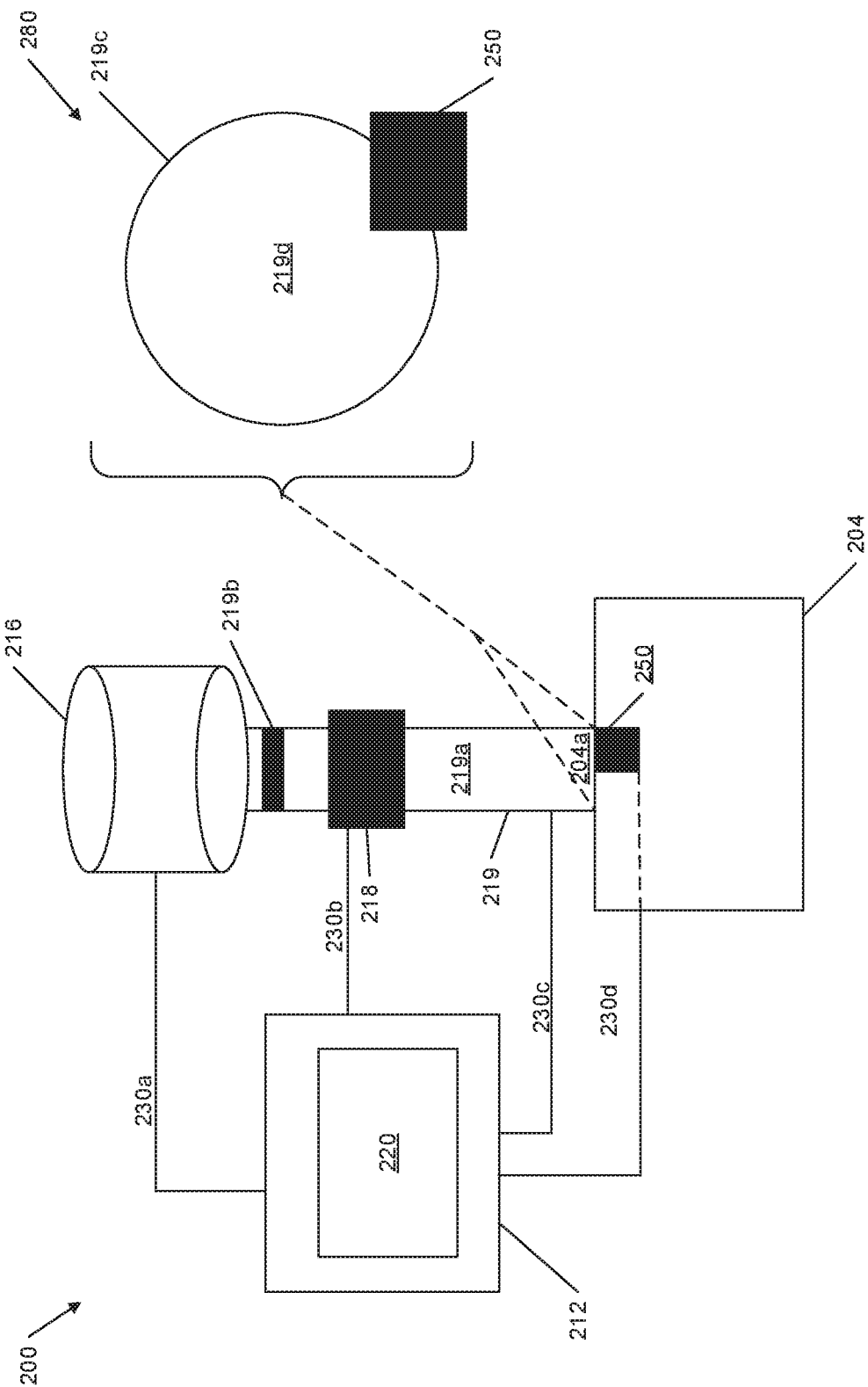
FIG. 2 is a block schematic diagram of an architecture for an apparatus for reductant dosing and quantity correction, according to an example embodiment.

FIG. 2 is a block schematic diagram of an architecture for an apparatus 200 for reductant dosing quantity correction, according to an example embodiment. In some embodiments, the apparatus 200 is an electronically or electrically controlled assembly for fluid reductant insertion. Fluid reductant insertion refers to electronically or electrically controlled metering and advancement of a suitable (gaseous, liquid, and the like) fluid reductant or reductant precursor chemical using controlled (e.g., timed) injection, spraying, vaporization, and the like. The apparatus 200 includes a pressurized reductant receiving chamber 204, a doser 212, one or more reductant sources 216, a pump 218, a reductant insertion conduit 219, a controller 220, communications circuitry comprising signal carrier lines 230a-d, and a reductant insertion pressure sensor 250. According to various embodiments, some or all components of the apparatus 200 may comprise an injector and/or be coupled thereto.

The pressurized reductant receiving chamber 204 includes at least one pressurized reductant receiver inlet 204a and is fluidly coupled, at the pressurized reductant receiver inlet 204a, to one or more reductant sources 216 via the reductant insertion conduit 219. According to various embodiments, the pressurized reductant receiving chamber 204 may comprise a metal, such as aluminized steel, cast iron, chromium, nickel, manganese, copper, and/or titanium, and/or a suitable metal alloy. The surface(s), and in particular the interior surface(s), of the pressurized reductant receiving chamber 204 may comprise a suitable ceramic coating.

During the reductant insertion cycle, a quantity of reductant is released from the reductant source 216. In some embodiments, the quantity of reductant is pressurized by the pump 218, which may be structured and operates similarly to the pump 118 described in reference to FIG. 1. The pressurized reductant is advanced via the reductant insertion conduit 219 for delivery and insertion into the pressurized reductant receiving chamber 204. In some embodiments, the pressurized reductant receiving chamber 204 is a decomposition chamber, such as the decomposition chamber 104 of FIG. 1, positioned downstream of the one or more reductant sources 216. The pressurized reductant receiving chamber 204 may hold a pressurized reductant precursor chemical while it undergoes a chemical reaction in which it is transformed into a chemical substance that is suitable for use in a catalyst unit, such as ammonia. In some embodiments, the pressurized reductant receiving chamber 204 is part of a catalyst unit positioned downstream of one or more reductant sources 216. The reductant is introduced directly from one or more reductant sources 216 to the pressurized reductant receiving chamber 204 through the reductant insertion conduit 219.

The reductant insertion conduit 219 includes a reductant delivery pipe 219a. The reductant delivery pipe 219a provides a channel for inserting the pressurized reductant from the reductant source 216 into the pressurized reductant receiving chamber 204. According to various embodiments, the reductant delivery pipe 219a may comprise a metal, such as aluminized steel, cast iron, chromium, nickel, manganese, copper, and/or titanium, and/or a suitable metal alloy. The surface(s) of the reductant delivery pipe 219a may comprise a suitable ceramic coating. In the example embodiment, the reductant delivery pipe 219a has a substantially circular cross-section 219c. In the callout 280, the front perspective view of the cross-section 219c is shown, the cross-section 219c defining a reductant delivery cross-sectional area 219d.

In some embodiments, a reductant insertion control valve 219b is positioned at the pressurized reductant receiver inlet 204a of the pressurized reductant receiving chamber 204. The size of the pressurized reductant receiver inlet 204a may be variable according to the operational state (e.g., open, partially open, closed) of the reductant insertion control valve 219b.

In the embodiment of FIG. 2, the pressurized reductant receiver inlet 204a is the point of reductant insertion into the pressurized reductant receiving chamber 204. The reductant insertion pressure sensor 250 determines (measures and/or estimates) a pressure value at the pressurized reductant receiver inlet 204a, which is the point of reductant insertion. The pressure value is used as an input by the controller 220, which is configured to estimate the flow rate of the reductant (the amount of reductant flowing through the reductant delivery cross-sectional area 219d at a given point in time) at the pressurized reductant receiver inlet 204a by estimating the flow rate difference as a function of pressure deviation from a target pressure value.

The doser 212 is configured to control the amount of reductant and/or reductant precursor inserted into the pressurized reductant receiving chamber 204 through the pressurized reductant receiver inlet 204a. In some embodiments, the doser 212 is a virtual doser comprising the controller 220, the communications circuitry comprising signal carrier lines 230a-d, and the reductant insertion pressure sensor 250. The doser 212 and/or its individual components may be implemented as or integrated with various suitable digital signal processing infrastructures, such as a Controller Area Network (CAN), Local Interconnect Network (LIN), FlexRay, Media Oriented Systems Transport (MOST), Ethernet, and/or an On-Board Diagnostics II (OBDII).

The controller 220 is structured and operates similarly to the controller 120 of FIG. 1. In some embodiments, the controller 220 is a PID controller. The controller 220 may be implemented as a Distributed Control System (DCS), a programmable logic controller (PLC), or in another suitable implementation.

The communications circuitry 230 comprises a signal carrier group, which may include the signal carrier line 230a (connecting the doser 212 with the reductant source 216), signal carrier line 230b (connecting the doser 212 with the pump 218), signal carrier line 230c (connecting the doser 212 with the reductant insertion conduit 219), signal carrier line 230d (connecting the doser 212 with the reductant insertion pressure sensor 250 positioned within an area within the structure defining the pressurized reductant receiver inlet 204a, such as a sidewall of the pressurized reductant receiving chamber 204.) The signal carrier lines in the signal carrier group may be structured to carry electrical signals (e.g., a signal wire comprising a metal) and/or electronic signals (e.g., a data bus implemented on a semiconductor medium, such as a silicon wafer, or on another suitable solid-state medium, such as an optical fiber medium).

The reductant insertion pressure sensor 250 may be structured and operate similarly to the sensor 150 of FIG. 1. The reductant insertion pressure sensor 250 may be implemented as a transducer configured to convert a pressure reading into an electrical signal and may be configured to output a voltage signal based on the captured pressure value. In some embodiments, the reductant insertion pressure sensor 250 may include an analog/digital converter to convert the voltage signal into a digital signal for interpretation by the processor of the controller 220.

The doser 212 determines a pressure-based dosing error for a reductant insertion event. In some embodiments, the length of the reductant insertion event is determined by adjusting its duration at runtime such that an appropriate amount of reductant is delivered. In some embodiments, the length of the reductant insertion event is determined by the actuation cycle of the pump 218 as further described in reference to FIG. 3.

To determine the pressure-based dosing error, the reductant insertion pressure sensor 250 is positioned in the reductant insertion area of the pressurized reductant receiving chamber 204, such as at the reductant insertion point defined by the reductant delivery cross-sectional area 219d of the reductant insertion control valve 219b and/or by the pressurized reductant receiver inlet 204a. The reductant insertion pressure sensor 250 is configured to read a pressure value associated with the reductant as the reductant is advanced through the reductant delivery pipe 219a. The reductant insertion pressure sensor 250 is configured to communicate the pressure value to the controller 220 for further processing by the doser 212, which includes determining the pressure-based dosing error, calculating the actual reductant dosing rate, and calculating a compensation factor.

The pressure-based dosing error value may be determined for every reductant insertion cycle while the apparatus 200 is in operation or for some reductant insertion cycles while the apparatus 200 is in operation. Thus, in some embodiments, the pressure is captured for some injection events and not others, which allows for a sampling-style approach to error correction. In other embodiments, the injection event(s) in which to capture the pressure are identified based on a flag set dynamically during operation or preset in the memory associated with the controller 220. In yet other embodiments, the reductant insertion pressure sensor 250 is programmable such that instructions for identifying the injection event(s) in which to determine the pressure are stored on a memory device associated with the reductant insertion pressure sensor 250.

The doser 212 is configured to use the pressure-based dosing error to calculate the actual dosing rate and to calculate a compensation factor. The actual dosing rate (the amount of reductant delivered to the pressurized reductant receiving chamber 204 at a given point in time) is determined by the actual flow rate of the reductant. As illustrated, for example, in FIG. 3, the actual flow rate of the fluid reductant is a function of the timing of the injector rest period and the injection event, which together comprise an injection cycle.

The compensation factor is reflective of the desired flow rate and comprises the desired total volume value of reductant to be dosed in a subsequent injection event. In some embodiments, the compensation factor comprises the volume value of the reductant to add to the target volume value of reductant during the next injection event such that, if the amount of reductant delivered to the pressurized reductant receiving chamber 204 during the current injection event is lower than the target, the target for the subsequent period is adjusted to compensate. Similarly, the compensation factor may comprise the volume value of reductant to subtract from to the original target volume value of reductant during the next injection event such that, if the amount of reductant delivered to the pressurized reductant receiving chamber 204 during the current injection event is higher than the target, the pressurized reductant receiving chamber 204 does not overflow in any of the controlled subsequent injection events.

In some implementations, the compensation factor is used to correct the performance of the apparatus 200 in the injection event immediately following the current reductant insertion period. In other implementations, the accumulated error is calculated based on two or more pressure-based dosing errors, which are determined, respectively, for two or more injection events. Advantageously, this approach may compensate, if needed, for the update rates and/or update intervals of the electronic circuitry associated with the controller 220. The accumulated error may be implemented as a variable representing a running total of individual pressure-based dosing errors. The compensation factor, calculated as described above, takes into account the accumulated error rather than individual pressure-based dosing errors. The compensation factor is then applied during a single injection event or, if this is not feasible (such as when the accumulated error is so large that applying the compensation factor in a single injection event would result in an overflow of the pressurized reductant receiving chamber 204 or when the timing of an injection event cannot be sufficiently extended), the doser 212 distributes the new target volume of reductant calculated based on the compensation factor over several injection events in successive injection cycles.

Figure 3:
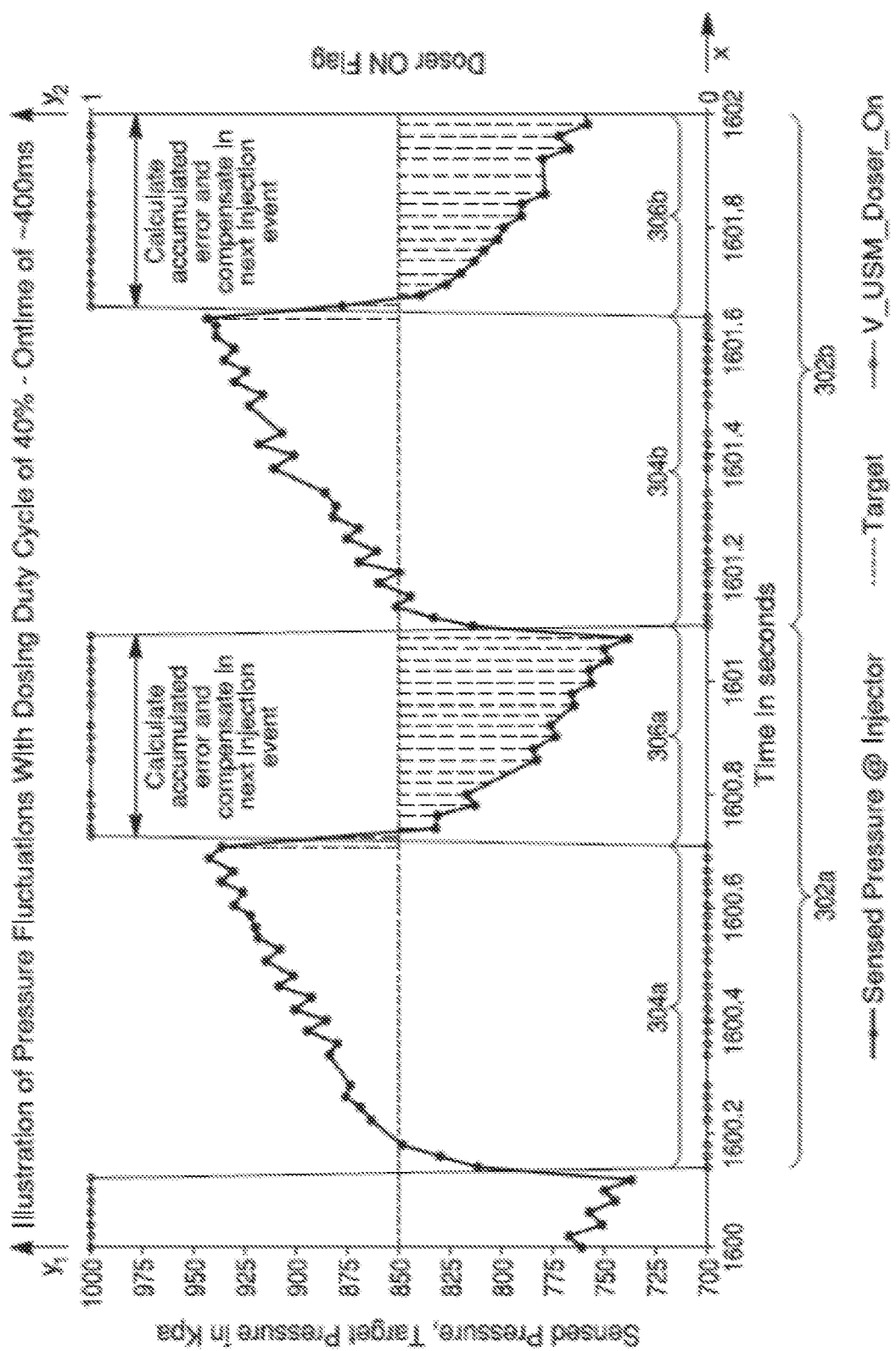
FIG. 3 is an illustration of pressure fluctuations during reductant insertion, according to an example embodiment.

Referring, for example, to the embodiment of FIG. 3, the compensation factor for the injection cycle 302a takes into account the pressure measured during the injection event 306a to calculate the pressure-based dosing error and the compensation factor during the injection event 306b. If the error is not accumulated, the compensation factor is applied to calculate the new target reductant dosage for the injection cycle 302b. If error accumulation is desired, a second compensation factor for the injection event 306b of the injection cycle 302b is calculated and aggregated with the first compensation factor for the injection cycle 302a. The aggregate compensation factor is applied during a subsequent injection event that follows the injection cycle 302b.

In some embodiments, the compensation factor is a multipart variable capable of storing several electronically or electrically transmitted values associated with the performance of the apparatus 200. For instance, the doser 212 of FIG. 2 may be structured to use the compensation factor to correct the performance of the apparatus 200 by adjusting the operation of the pump 218 and/or the reductant insertion control valve 219b to deliver the desired amount of reductant to the pressurized reductant receiving chamber 204.

Adjusting the operation of the pump 218 may include setting the compensation factor by the doser 212 to comprise, for example, current and/or desired operating speed (injector rest period time) of the pump 218, current and/or desired pressure at an inlet of the pump 218, current and/or desired pressure at an outlet of the pump 218, and/or other relevant operating parameters of the pump. Transducers and/or sensors, such as one or more sensors 150 of FIG. 1, may be used to determine these values. The dosing system 112 may issue instructions by the controller 220 to set or adjust the relevant operating parameter of the pump 218 according to the compensation factor.

Adjusting the operation of the reductant insertion control valve 219b may include setting the compensation factor by the doser 212 to comprise the desired operational state of the reductant insertion control valve 219b and/or the duration therefor, thus defining an operating cycle for the reductant insertion control valve 219b. In particular, the reductant insertion control valve 219b is actuated in response to the actuation of the pump 218. The flow rate is determined by the size of the reductant delivery cross-sectional area 219d, which, in turn, is determined by the operating cycle of the reductant insertion control valve 219b. In some embodiments, the flow rate value of the reductant, measured at a point in time, is directly proportional to the size of the reductant delivery cross-sectional area 219d at the same point in time.

FIG. 3 is a schematic diagram showing pressure fluctuations during reductant insertion, according to an example embodiment. An example reductant insertion cycle is a DEF injection cycle using the apparatus 200 of FIG. 2. The reductant (DEF fluid) is delivered from the one or more reductant sources 216 to the pressurized reductant receiving chamber 204 of FIG. 2. In implementations where a pump, such as the pump 218 of FIG. 2, is used, the reductant is pressurized at the outlet of the reductant source 216 as the pump 218 is engaged. In such implementations, the DEF injection cycle is the actuation cycle of the pump 218.

The abscissa (x-axis) shows sequential injector cycles. As shown, the injection cycle 302a is immediately followed by the injection cycle 302b. Each injector cycle comprises an injector rest period and an injection event. For example, the injection cycle 302a comprises an injector rest period 304a with the duration of approximately 60% of the injection cycle 302a and an injection event 306a with the duration of approximately 40% of the injection cycle 302a. As part of dosing correction, these durations can be varied as needed such that the injection cycle 302a is set to be of a desired length relative to a predetermined period of time in order to dose the target amount of reductant. Additionally or alternatively, the length of the injection event 306b may be extended. The first ordinate (y1-axis) shows the pressure of reductant in kPa. The second ordinate (y2-axis) shows the pump command status, which may be expressed as a percentage.

As shown, reductant delivery systems can experience inherent delays and inaccuracies between the requested dosing rate and the actual dosing rate due to the valve opening and closing characteristics associated with pulsed dosage devices. As shown, at a 40% desired dosing command on a DEF injector (corresponding to the flow rate of ~1.15 ml/s or 4.5 kg/hr), the average pump command corresponding to the dosed flow rate is ~33%. However, in reality the valve (such as the reductant insertion control valve 219b of FIG. 2) is open for 40% of the time representative of the duty cycle of the injector, determined by the requested flow rate by aftertreatment system and the actual pressure in the system for a given injector specification This requires the flow rate corresponding to the 100% dosing command (2.91 ml/s dosed flow rate or 1.37 kg/hr+8.5 kg/hr recirculation) for 40% of the time (or ~400 ms), equating to roughly to the 62% pump command. Similarly, the valve is closed for 60% of the time, which requires the flow rate of 0 ml/s (or only the 8.5 kg/hr recirculation flow rate) for 60% of the time, equating to roughly 16% pump command. As discussed in reference to FIG. 2 and/or FIG. 4, when accurate information about the pressure at the point of injection is available, this error can be corrected by estimating a flow rate difference as a function of pressure deviation from target. This error estimation can be cumulative over the period of injection such that reductant dosing quantity correction is based on accumulated error.

Figure 4:
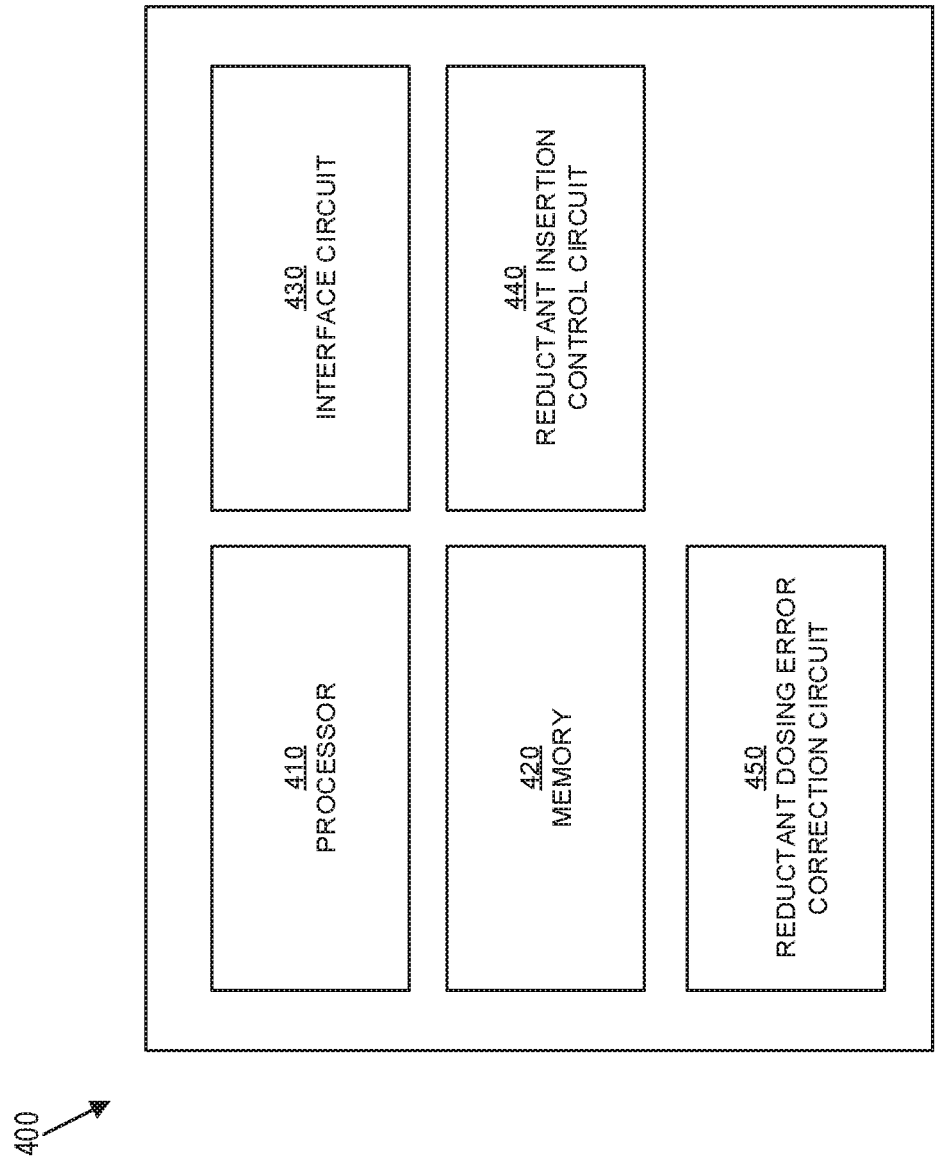
FIG. 4 is a schematic block diagram of a reductant dosing and error correction controller, according to an example embodiment.

FIG. 4 is a schematic block diagram of a reductant dosing and error correction controller 400 in an example embodiment. The reductant dosing and error correction controller 400 may be included in or coupled to the doser 212 of FIG. 2. The example reductant dosing and error correction controller 400 comprises at least one processor 410, a memory 420, an interface circuit 430, a reductant insertion control circuit 440, and a reductant dosing error correction circuit 450. The reductant dosing and error correction controller 400 is configured as described in reference to FIG. 5. As will be appreciated by one skilled in the art, the various programmable components of the dosing and error correction controller 400 include the reductant insertion control circuit 440 and the reductant dosing error correction circuit 450. These circuits may comprise instructions stored in non-transient memory, such as the memory 420. The instructions are compiled and/or executed by the processor 410 and communicated to various other components of the system through the interface circuit 430 via, for example, the communications circuitry comprising signal carrier lines 230a-d discussed in reference to FIG. 2.

Figure 5:
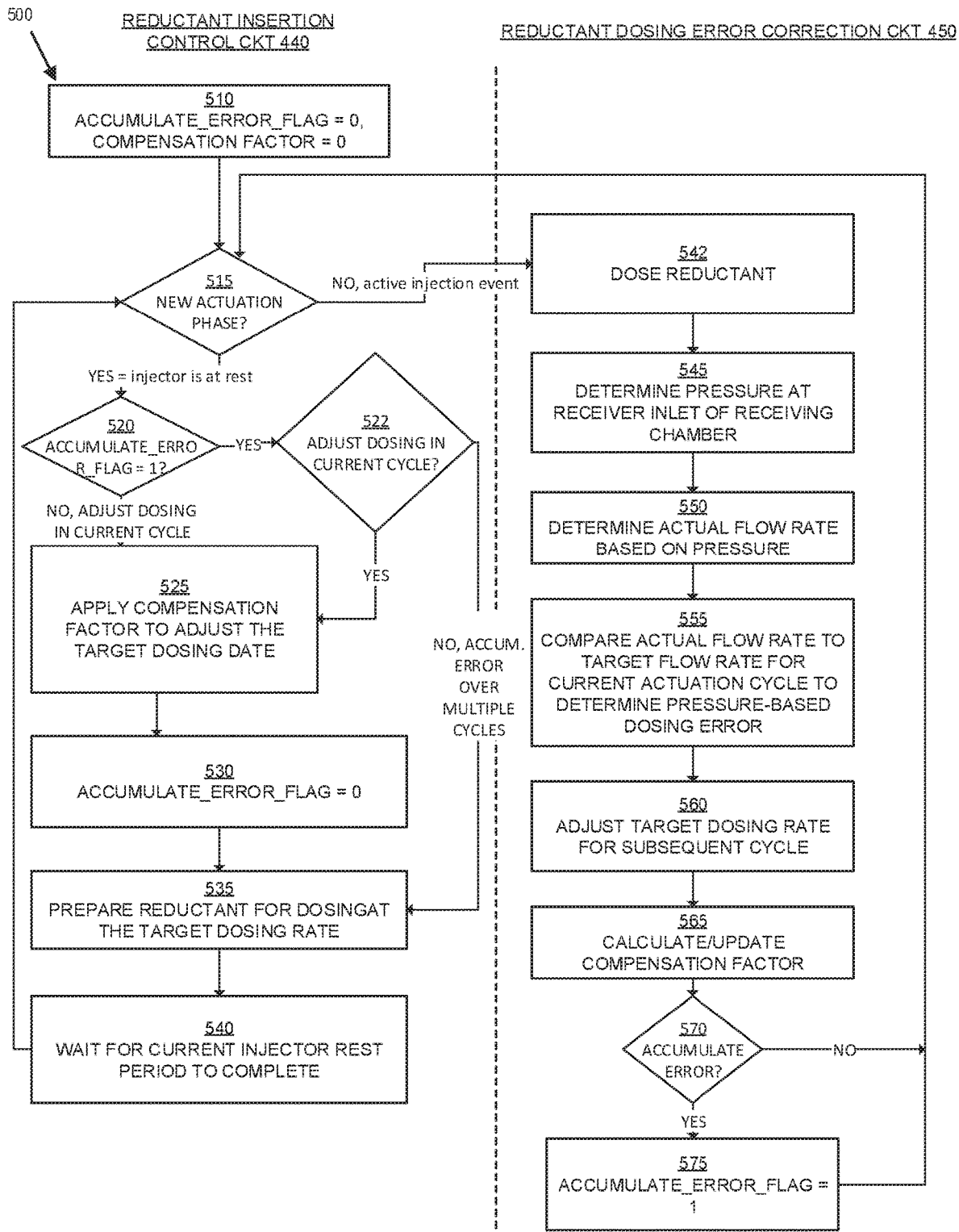
FIG. 5 is a schematic diagram of a method for reductant dosing quantity correction based on accumulated error during reductant insertion, according to an example embodiment.

FIG. 5 is a schematic diagram of a method 500 for reductant dosing quantity correction based on accumulated error during reductant insertion, according to an example embodiment. The method 500 comprises the processes, which, in the example embodiment, are performed or initiated by various components of the reductant dosing and error correction controller 400 of FIG. 4.

The reductant insertion control circuit 440 is structured to perform the processes associated with dosing the reductant into a suitable receiving chamber of an exhaust aftertreatment system, such as the pressurized reductant receiving chamber 204 of FIG. 2. These processes are performed during the injection event of a reductant injection cycle.

At 510, to initialize the system prior to an initial actuation phase, the accumulated error flag is set to 0. In the example embodiment, the value of 1 of the accumulated error flag indicates that the error correction process in certain injection events should be skipped and instead an accumulated error value should be calculated over several subsequent cycles for correction at a later time. The value of 0 of the accumulated error flag indicates that the error correction process should be performed for each consecutive injection cycle, such as 302a and 302b of FIG. 3.

At 515, it is determined whether the system is presently in a new actuation phase (injection cycle)—that is, if the injector is closed as in 304a of FIG. 3. If the system is in a new actuation phase, then at 520, it is determined whether the accumulated error flag is set to 1. If the accumulated error flag is not set to 1, the reductant insertion control circuit 440 applies, at, 525, a compensation (error correction) factor calculated during a previous injection event, as described below in reference to 550-575, such that the target dosing rate for the current injection cycle is adjusted by the compensation factor. In some embodiments, adjusting the compensation factor includes lengthening or shortening the injection cycle that follows the current injection cycle such that an appropriate amount of reductant is dosed. At 530, the accumulated error flag is reset to 0.

At 535, the reductant is prepared for dosing at the target dosing rate for the injection event of the current cycle. It should be understood that the target dosing rate for the current cycle may have been determined and/or adjusted during a previous cycle as described below in reference to 550-575.

At 540, the reductant insertion control circuit is structured to await completion of the injector rest period of the current injection cycle. According to various embodiments, such that of FIG. 1, this may be accomplished by using one or more sensors 150 to poll the various components of the system, including the pump 118, using electronic flags set by the control circuitry associated with the pump 118, implementing a timer, or through another suitable process.

The reductant dosing error correction circuit 450 is structured to perform the processes associated with correcting the dosing rate of the reductant inserted into a suitable receiving chamber of an exhaust aftertreatment system, such as the pressurized reductant receiving chamber 204 of FIG. 2. These processes are performed during the injection event of an injection cycle.

At 542, the injector is activated and the reductant is dosed at the current rate.

At 545, the reductant insertion control circuit is structured to determine the pressure of the reductant at the receiver inlet of the receiving chamber as described, for example, in reference to FIG. 2. The pressure may be determined by a sensor positioned at the inlet of the receiving chamber, such as the reductant insertion pressure sensor 250.

The pressure value determined at 545 is used by the reductant dosing error correction circuit 450 as an input to determine the actual flow rate, the pressure-based dosing error, the adjusted target dosing rate, and the compensation factor for adjusting the performance of the system in the subsequent cycles so that a new target dosing rate may be reached.

At 550, the actual flow rate for the current cycle is determined based on the pressure value obtained at 545. At 555, the actual flow rate is compared to the target flow rate for the current cycle such that the pressure-based dosing error value is determined. At 560, the target dosing rate for a subsequent cycle is adjusted by this value. According to various embodiments, the target dosing rate may be stored in a suitable reference data structure in the memory 420 of the reductant dosing and error correction controller 400, dynamically calculated at runtime, and/or received at runtime as an input by an auxiliary component of the exhaust aftertreatment system and/or other components interfaced therefrom.

At 565, the compensation factor is set to include at least the target dosing rate and/or the volume of reductant dosed per cycle. Additionally or alternatively, in some embodiments, the compensation factor includes lengthening or shortening the injection cycle such that an appropriate amount of reductant is dosed. The compensation factor is defined as described in reference to FIG. 2 and may include additional variables, including the desired pressure value(s) associated with the pump 118 and/or the desired position of the reductant insertion control valve 219b to define the size of the inlet, such as the pressurized reductant receiver inlet 204a, of the receiving chamber. The amount of time the reductant insertion control valve 219b is open may be adjusted. In a subsequent cycle, the compensation factor is used at 525 to adjust the target dosing rate. One skilled in the art will appreciate that the process 525 may be performed, according to various embodiments, for each cycle or, such as when the errors are accumulated, for some cycles. At 570, it is determined whether the errors should be accumulated. If the answer is yes, the accumulate error flag is set to 1. The process loops back to 515, where a determination is made whether a new injector rest period has commenced. If it has, the values calculated and/or defined at 550-575 become inputs to the dosing processes associated with the next injection event.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., an FPGA or an ASIC.

The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

As utilized herein, the terms "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The term "coupled" and the like as used herein means the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An assembly for reductant dosing error correction in an exhaust aftertreatment system, the assembly comprising:
    an injector fluidly coupled to a reductant source, the injector comprising a reductant insertion conduit;
    a pump configured to advance a quantity of dosed reductant from the reductant source;
    a reductant source outlet defined by the reductant source and configured to release the quantity of dosed reductant into the reductant insertion conduit;
    a pressurized reductant receiving chamber defining a pressurized reductant receiver inlet;
    a reductant insertion pressure sensor positioned at the pressurized reductant receiver inlet; and
    a doser comprising a controller and coupled to the reductant insertion pressure sensor;
    wherein the assembly is configured to effectuate a first injection cycle that comprises a first injector rest period and a first injection event, the first injection cycle having a first target flow rate;
    wherein the reductant insertion pressure sensor is configured to determine a first actual pressure of the reductant during the first injection event at the pressurized reductant receiver inlet; and
    wherein the controller of the doser is configured to:
        based on the first actual pressure of the reductant, calculate a second target flow rate for a second injection cycle subsequent to the first injection cycle; and
        control a quantity of dosed reductant released into the reductant insertion conduit during the second injection cycle based on the second target flow rate.

2. The assembly of claim 1, wherein the reductant insertion conduit comprises a reductant insertion control valve, and wherein the quantity of dosed reductant released into the reductant insertion conduit is controlled by moving the reductant insertion control valve.

3. The assembly of claim 2, wherein the pressurized reductant receiver inlet has a variable reductant insertion cross-sectional area defining an actual volume of the quantity of dosed reductant.

4. The assembly of claim 1, wherein a quantity of dosed reductant released into the reductant insertion conduit during the second injection cycle is controlled by adjusting the duration of the second injection cycle.

5. The assembly of claim 1, wherein the controller is further configured to calculate the second target flow rate for the second injection cycle by:
    determining a first actual flow rate at the pressurized reductant receiver inlet for the quantity of dosed reductant, the first actual flow rate based on the first actual pressure of the reductant measured during the first injection cycle;

determining a pressure-based dosing error for the first injection event, the pressure-based dosing error based on a calculated deviation of the first actual flow rate from the first target flow rate, the deviation being calculated based on a first target volume of the quantity of dosed reductant; and determining a compensation factor for reductant dosing based on the pressure-based dosing error, the compensation factor including at least a target duration for the second injection event of the second injection cycle;

wherein the second injection cycle follows the first injection cycle.

6. The assembly of claim 5, wherein the controller is further configured to apply the second target flow rate to dose reductant in a subsequent injection cycle, the subsequent injection cycle following the first injection cycle.

7. The assembly of claim 6, wherein the subsequent injection cycle is the second injection cycle immediately following the first injection cycle.

8. The assembly of claim 6, wherein the controller is further configured to:

calculate a third target flow rate for a third injection cycle following the second injection cycle, the third target flow rate reflective of an accumulated dosing error over the first injection cycle and the second injection cycle; and apply the third target flow rate in the subsequent injection cycle;

wherein the second injection cycle immediately follows the first injection cycle and the subsequent injection cycle follows the second injection cycle.

9. A method for reductant dosing error correction in an exhaust aftertreatment system, the method comprising:

providing an assembly comprising:
an injector fluidly coupled to a reductant source, the injector comprising a reductant insertion conduit;
a pump configured to advance a quantity of dosed reductant from the reductant source;
a reductant source outlet defined by the reductant source and configured to release the quantity of dosed reductant into the reductant insertion conduit;
a pressurized reductant receiving chamber defining a pressurized reductant receiver inlet;
a reductant insertion pressure sensor positioned at the pressurized reductant receiver inlet; and
a doser comprising a controller and coupled to the reductant insertion pressure sensor;

effectuating a first injection cycle that comprises a first injector rest period and a first injection event, the first injection cycle having a first target flow rate;

determining a first actual pressure of the reductant during the first injection event at the pressurized reductant receiver inlet;

based on the first actual pressure of the reductant, calculating a second target flow rate for a second injection cycle subsequent to the first injection cycle; and controlling a quantity of dosed reductant released into the reductant insertion conduit during the second injection cycle based on the second target flow rate.

10. The method of claim 9, wherein the reductant insertion conduit comprises a reductant insertion control valve, and wherein the quantity of dosed reductant released into the reductant insertion conduit is controlled by moving the reductant insertion control valve.

11. The method of claim 10, wherein the pressurized reductant receiver inlet has a variable reductant insertion cross-sectional area defining an actual volume of the quantity of dosed reductant.

12. The method of claim 9, wherein the quantity of dosed reductant released into the reductant insertion conduit is controlled by adjusting the duration of the second injection cycle.

13. The method of claim 9, the method further comprising calculating the second target flow rate for the second injection cycle by:

determining a first actual flow rate at the pressurized reductant receiver inlet for the quantity of dosed reductant, the first actual flow rate based on the first actual pressure of the reductant measured during the first injection cycle;

determining a pressure-based dosing error for the first injection event, the pressure-based dosing error based on a calculated deviation of the first actual flow rate from the first target flow rate, the deviation being calculated based on a first target volume of the quantity of dosed reductant; and determining a compensation factor for reductant dosing based on the pressure-based dosing error, the compensation factor including at least a target duration for the second injection event of the second injection cycle;

wherein the second injection cycle follows the first injection cycle.

14. The method of claim 13, further comprising applying the second target flow rate to dose reductant in a subsequent injection cycle, the subsequent injection cycle following the first injection cycle.

15. The method of claim 14, wherein the subsequent injection cycle is the second injection cycle immediately following the first injection cycle.

16. The method of claim 14, the method further comprising:

calculating a third target flow rate for a third injection cycle following the second injection cycle, the third target flow rate reflective of an accumulated dosing error over the first injection cycle and the second injection cycle; and applying the third target flow rate in the subsequent injection cycle;

wherein the second injection cycle immediately follows the first injection cycle and the subsequent injection cycle follows the second injection cycle.

17. The method of claim 9, wherein the quantity of dosed reductant is injected over multiple injection cycles.

* * * * *